UNITED STATES PATENT OFFICE.

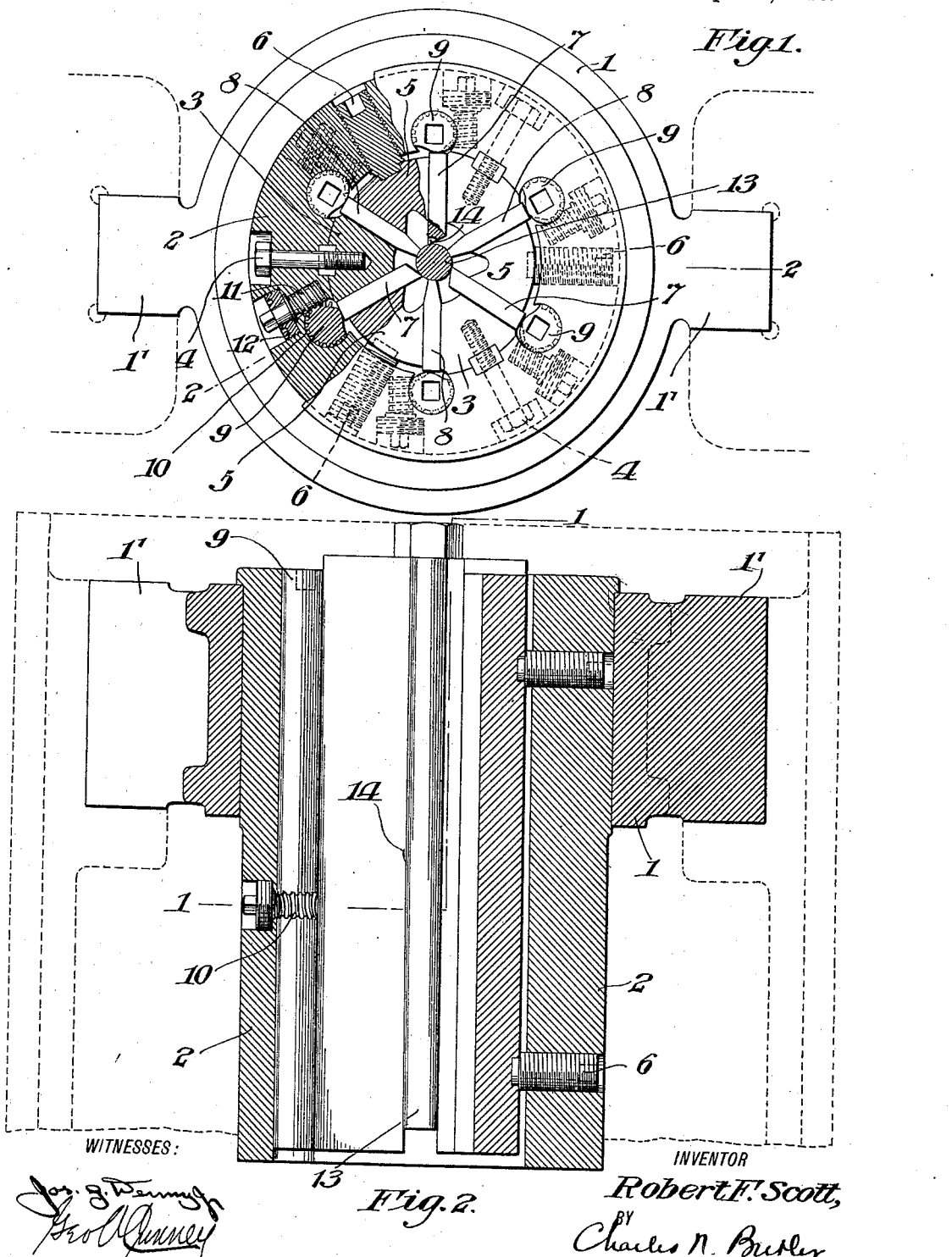

ROBERT F. SCOTT, OF PHILADELPHIA, PENNSYLVANIA, ASSIGNOR TO EDWIN HARRINGTON, SON & CO., INC., OF PHILADELPHIA, PENNSYLVANIA, A CORPORATION OF PENNSYLVANIA.

BOLT-TURNING MACHINE.

1,074,138.   Specification of Letters Patent.   Patented Sept. 30, 1913.

Application filed November 6, 1912. Serial No. 729,901.

*To all whom it may concern:*

Be it known that I, ROBERT F. SCOTT, a citizen of the United States, residing in the city of Philadelphia, county of Philadelphia, and State of Pennsylvania, have invented certain Improvements in Bolt-Turning Machines, of which the following is a specification.

My invention is designed primarily to provide improved means for finishing bolts which must be turned true throughout their entire lengths, particularly for turning taper bolts such as are used in the frames of locomotives. But it will be understood that the mechanism is of more general application and it is not intended to restrict its use to bolts of peculiar character.

The characteristic features and functions of my improved machine will be understood from the following description and the accompanying drawings in illustration thereof.

In the drawings, Figure 1 is a partly sectional plan view of mechanism embodying my improvements, the section being taken on the line 1—1 of Fig. 2, and Fig. 2 is a vertical sectional view of the same taken on the line 2—2 of Fig. 1.

The mechanism, as illustrated in the drawings, comprises a collar 1 provided with the diametrically disposed lugs 1' by which it is adapted to be engaged in a stationary tank or table. A cylindrical shell or hollow body 2 is held within the collar. Fixed sectors or segmental blocks 3 are secured within the shell, with equal spaces between them, by the bolts 4, and movable sectors or segmental blocks 5 are held in the spaces between the fixed sectors by the radial locking bolts 6 whereby they are adjustable radially. Alternating radially disposed cutting blades 7 and guiding bars 8 are respectively engaged between adjacent faces of a fixed and a movable sector, in axial planes separated by 60 degrees in the form illustrated. Cams 9, having the worm teeth 10, are journaled in the shell 1, parallel to the axis thereof, and engage the backs of the respective blades 7 and bars 8 which are movable toward the axis by turning the cams. Revoluble worms 11, held against longitudinal movement in the shell by nuts 12, engage the worm teeth of the cams, which are turned by applying a key to the heads of the respective worms.

In the operation, with the adjustable sectors 5 withdrawn toward the shell 2 by the bolts 6, the cutting blades 7 and the guiding bars 8 are adjusted between the respective fixed sectors 3 and the movable sectors 5, to engagement with a hardened steel plug or form of the size of the finished bolt, the blades and bars being adjusted to and fixed in the desired positions by turning the cams 9 and moving the sectors 5 by turning the bolts 6 so as to clamp the respective blades and bars between the fixed and movable segments. The mechanism being set, a bolt 13 is revolved and moved longitudinally in the axis of the mechanism, being guided by the bars or guides 8 and turned to the finished form desired by the cutters 7.

It is to be understood that the edges of the cutters 7 and guides 8 may be straight, curved or otherwise formed to guide various forms of bolts and give them the desired finishing cut.

In turning long bolts, say 12 inches or more in length, the edges of the cutters are provided with nicks 14 ground therein, suitably $\frac{1}{8}$ inch in width and $\frac{1}{16}$ inch in depth, to break up chips into pieces shorter than the length of the cutter, these nicks being placed so that the ring left in the bolt by one cutter will be removed by the following cutter.

Having described my invention, I claim:

1. In a turning machine, the combination of a collar, a body set in said collar, sectors fixed in said body with spaces between them, sectors movable in said spaces, means connected with said body whereby said movable sectors are adjusted relatively to said fixed sectors, cams journaled in said body substantially parallel to the axis thereof, means for turning said cams, and cutters and guides adapted to be clamped within said body by said sectors and to be adjusted by said cams.

2. In a turning machine, the combination of a body, a revoluble cam journaled eccentrically therein, said cam having teeth adapted for engaging a worm, a revoluble worm engaging said teeth whereby said cam is turned, a cutter adjustable by the turning of said cam, and adjustable means for clamping said cutter in position.

3. In a turning machine, the combination of a body, a revoluble cam journaled eccentrically therein, said cam having teeth adapted for engaging a worm, a revoluble worm engaging said teeth whereby said cam is turned, a guide adjustable by the turning of said cam, and adjustable means for clamping said guide in position.

4. In a turning machine, a hollow body, toothed cams journaled therein, means for operating said cams, cutters and guides adjustable by said cams, and means for clamping said cutters and guides in position, said means comprising fixed sectors and adjustable sectors held within said body.

5. In a turning machine, a hollow body, cams journaled in said body, means movable relatively to and engaging said cams for operating them, cutters and guides adjustable radially in said body by said cams, and fixed sectors and radially movable sectors in said body for clamping said cutters and guides in their adjusted positions.

6. In a turning machine, a hollow body, cams journaled in said body, said cams having teeth adapted for engaging a worm, worms journaled in said body in engagement with said teeth, cutters and guides adjustable radially in said body by turning said cams, sectors fixed in said body, and sectors adjustable in said body, said sectors being adapted for clamping said cutters and guides in position.

7. In a turning machine, a collar having lugs thereon for holding it, a cylindrical body set in said collar, sectors fixed in said body with equal spaces between them, sectors movable in said spaces, bolts in said body whereby said last named sectors are moved radially, cams journaled in said body substantially parallel to the axis thereof, means for turning said cams, and cutters and guides adapted to be clamped within said body by said sectors and to be adjusted by said cams.

In witness whereof I have hereunto set my name this 31st day of October, 1912, in the presence of the subscribing witnesses.

ROBT. F. SCOTT.

Witnesses:
A. M. HARRINGTON,
ROGER SHERRON.

---

Copies of this patent may be obtained for five cents each, by addressing the "Commissioner of Patents, Washington, D. C."